US006764096B2

(12) United States Patent
Quioc

(10) Patent No.: US 6,764,096 B2
(45) Date of Patent: Jul. 20, 2004

(54) DUAL CHAMBER INFLATOR

(75) Inventor: Eduardo L. Quioc, Westland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 141 days.

(21) Appl. No.: 10/058,866

(22) Filed: Jan. 28, 2002

(65) Prior Publication Data

US 2002/0101068 A1 Aug. 1, 2002

Related U.S. Application Data

(60) Provisional application No. 60/264,548, filed on Jan. 26, 2001.

(51) Int. Cl.[7] .............................................. B60R 21/26
(52) U.S. Cl. ........................................ 280/736; 280/741
(58) Field of Search .............................. 280/736, 741, 280/742, 737

(56) References Cited

U.S. PATENT DOCUMENTS

| 5,513,879 | A  | * | 5/1996  | Patel et al. ................. 280/739 |
| 6,032,979 | A  | * | 3/2000  | Mossi et al. ................ 280/741 |
| 6,189,927 | B1 | * | 2/2001  | Mossi et al. ................ 280/741 |
| 6,199,906 | B1 | * | 3/2001  | Trevillyan et al. .......... 280/741 |
| 6,227,565 | B1 | * | 5/2001  | McFarland et al. ......... 280/736 |
| 6,315,322 | B1 |   | 11/2001 | Mika .......................... 280/736 |
| 6,318,754 | B1 |   | 11/2001 | Einsiedel et al. ........... 280/736 |

FOREIGN PATENT DOCUMENTS

| JP | 2000296756 A | * | 10/2000 | ........... B60R/21/26 |
| JP | 2002274316 A | * | 9/2002  | ........... B60R/21/26 |

\* cited by examiner

Primary Examiner—David R. Dunn
(74) Attorney, Agent, or Firm—Dinnin & Dunn, P.C.

(57) ABSTRACT

A dual chamber inflator 10 contains a housing 12 having a base 14 and a cap 16. A divider disc 18 divides the inflator 10 into a first chamber 20 and a second chamber 22. Divider 18 contains at least one aperture 60 thereby facilitating fluid communication between chambers 20 and 22 for simultaneous operation of chambers 20 and 22.

3 Claims, 1 Drawing Sheet

DUAL CHAMBER INFLATOR

CROSS REFERENCE TO RELATED APPLICATIONS

This application claims the benefit of provisional application Serial No. 60/264,548 filed on Jan. 26, 2001.

BACKGROUND OF THE INVENTION

The present invention relates to gas generators, used to inflate air bags in a vehicle occupant protection system for example, and more particularly, to an improved dual chamber gas generator containing an improved structure for isolating the propellant chambers of a dual chamber inflator so as to ensure proper deployment of the airbag.

Inflation systems for deploying an air bag in a motor vehicle generally employ a single gas generator in fluid communication with an uninflated air bag. A firing circuit typically triggers the gas generator when the sensed vehicle acceleration exceeds a predetermined threshold value, as through the use of an acceleration-responsive inertial switch.

However, air bag inflation systems utilizing a single gas generator suffer from the disadvantage that the onset pressurization/inflation rate is generally set to provide aggressive initial inflation in order to achieve a particular inflation time related to occupant position. An aggressive onset rate of pressurization becomes problematic in situations where the occupant is out of position. More specifically, rapid onset pressurization of the air bag can cause the air bag to impact against the occupant with enough force to injure the occupant. The airbag volume and inflating capacity are designed to protect both large and small occupants and are generally not variable within the single gas generator. Occasionally, when an air bag utilizing a single gas generator is deployed, smaller occupants, usually children and smaller women, have been seriously injured.

Commonly owned U.S. Pat. No. 5,400,487 discloses an inflation system which overcomes the above problem by utilizing a plurality of gas generators which are controllably ignited to provide a variable inflation profile which can be tailored to any given occupant weight and/or position and for any crash type. While this arrangement dramatically improves the inflation system's ability to protect an occupant, it does so at significant expense and complexity. The multiple gas generators and squibs add considerable cost to the system, while the firing control circuitry requires sophisticated processors capable of accurately timing the various ignition profiles.

Another proposal, as taught in commonly owned U.S. Pat. No. 5,934,705, is a gas generator having two chambers in a single housing defined by a mechanically retained wall between the ends thereof. Each housing is of a predetermined size that is determinative of the propellant capacity and consequently, of the inflating capability of each chamber. Upon the occurrence of a vehicle collision, depending on the weight of the passenger, either chamber or both may be selectively ignited thereby inflating the protective airbag. However, the structural integrity of such a known dual chamber inflator, may be compromised by failure of the wall separating the chambers when only one chamber is fired.

Given the above, typical dual chamber inflators often require a more robust design, resulting in relatively higher costs and more complicated manufacturing as compared to a single chamber inflator.

Therefore, a need exists for a dual chamber gas generator that exhibits a simplified design and therefore lower material and manufacturing costs, and yet can still produce selective air bag inflation pressurization without hazardous structural failure of the gas generator.

SUMMARY OF THE INVENTION

Complete isolation of the chambers of a dual chamber airbag inflator is critical to soft deployment of the airbag. Accordingly, the present invention relates to an improved structure for isolating the propellant chambers of a dual chamber inflator so as to insure proper deployment. Two separate igniter assemblies extend through primary and secondary propellant chambers for selective gas generation therein. A divider disc separates the primary and secondary chambers such that independent operation of each chamber is assured. The present invention permits sequential or simultaneous activation of the two chambers while enhancing the safety of the inflator and reducing the manufacturing costs.

DETAILED DESCRIPTION OF THE PREFERRED EMBODIMENT OF THE INVENTION

Figure 1:
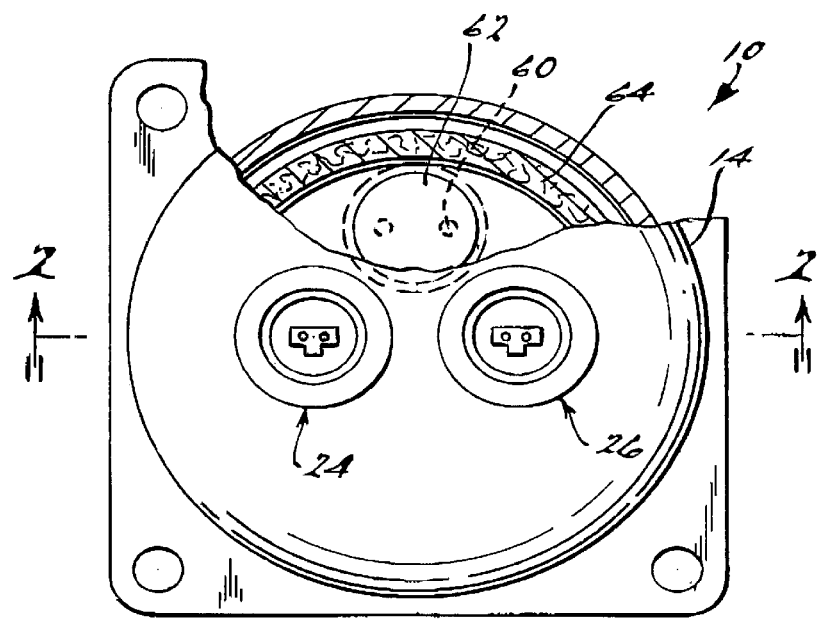
FIG. 1 is a cross-sectional top view of a two-chamber inflator in accordance with the present invention.
Figure 2:
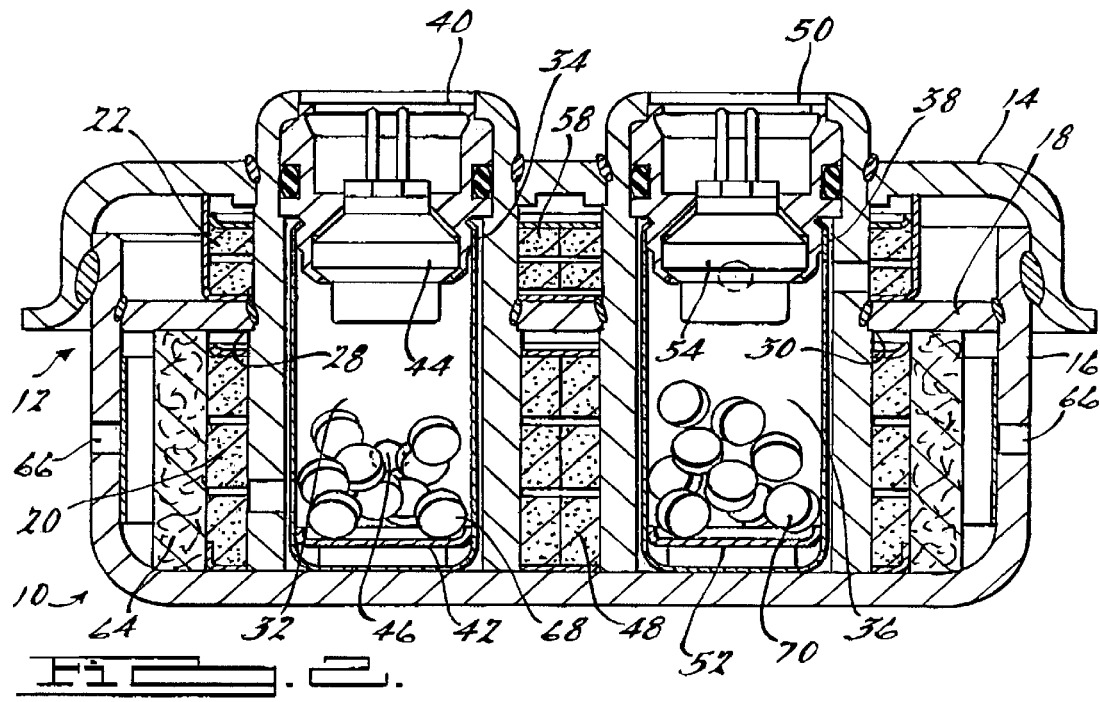
FIG. 2 is a cross-sectional view taken along the line 2—2 of FIG. 1.

As seen in the figures, an inflator 10, in accordance with a preferred embodiment of the present invention, contains a housing 12 formed from a base 14 welded or otherwise fixed to a cap 16. A divider disc 18 divides the housing 12 into a primary chamber 20 and a secondary chamber 22, whereby the chamber 20 is formed within the base 16 and the chamber 22 is formed within the base 14.

The base 14, cap 16, and divider disc 18 are preferably formed from stamped steel, or by other known and accepted methods and materials. The base 14 contains a first annulus 24 and a second annulus 26. The divider disc 18 contains a third annulus 28 and a fourth annulus 30, each in corresponding axial alignment with first annulus 24 and second annulus 26, respectively.

As shown in the Figures, a first igniter chamber 32 is formed when a first igniter tube 34 is inserted through and welded to the first and third annuli 24 and 28, respectively, wherein tube 34 and annuli 24 and 28 are substantially equal in circumference. Similarly, a second igniter chamber 36 is formed when a second igniter tube 38 is inserted through and welded to the second and fourth annuli 26 and 30, respectively, wherein tube 38 and annuli 26 and 30 are also substantially equal in circumference.

Chamber 32 contains a proximate end 40 and a distal end 42. A first igniter 44 is inserted through the proximate end 40 and is thereby disposed within ignition chamber 32. Igniter 44 is then preferably crimped to tube 34. At least one gas exit aperture 46 extends through distal end 42 thereby facilitating fluid communication between chamber 32 and a primary gas generant propellant 48 within the primary gas generant chamber 20.

Chamber 36 contains a proximate end 50 and a distal end 52. A second igniter 54 is inserted through the proximate end 50 and is thereby disposed within chamber 36. Igniter 54 is then preferably crimped to second tube 38. At least one second gas exit aperture 56 extends through proximate end 50 thereby facilitating fluid communication between ignition chamber 36 and a secondary primary gas generant propellant 58 within the secondary gas generant chamber 22.

An annular filter 64 is peripherally and radially spaced from an axis extending through chambers 20 and 22. A second plurality of gas exit apertures 66 are circumferentially and homolaterally disposed within the housing 12 and about the primary gas generant chamber 20, thereby providing fluid communication between the chamber 20 and an airbag (not shown). In a preferred embodiment, foil covers each aperture in the third plurality of apertures 66, thereby sealing chamber 20.

As shown in the figures, the disc 18 is welded to tubes 34 and 38 and to the cap 16. The tubes 34 and 38 are also welded to the cap 16 thereby enhancing structural integrity.

A first initiator composition 68 is provided within the first ignition chamber 32. A second initiator composition 70, the same as or different from composition 68, is provided within the second chamber 36.

In operation, a vehicle occupant protection system generates a signal indicating sudden deceleration or a crash event that is then sensed by igniter 44 thereby triggering ignition of the first initiator propellant 68. Upon ignition of composition 68, the heat, flame, and combustion gases produced flow into the primary gas generant chamber 20 thereby igniting the primary gas generant propellant 48. The resultant gases then flow from chamber 20 through filter 64 and out apertures 66 into an airbag (not shown).

The second chamber 22 is selectively operated based on factors such as crash severity, occupant position sensing, and the weight and/or height of the occupant. The divider disc 18 contains at least one aperture and preferably a first plurality of gas exit apertures 60 for transfer of secondary gas from chamber 22 into chamber 20. A first burst shim (e.g. steel or aluminum) 62 covers the plurality of apertures 60 on an upper or first disc surface 57 thereby sealing chamber 22 and facilitating a sufficient increase in combustion pressure when the second chamber 22 is activated. A seal 61, such as sealing tape, is preferably fixed to a lower or second disc surface 59 thereby preventing flame front and hot gases from migrating from the lower chamber 20 into the upper chamber 22. As such, given a lower weight occupant, chamber 20 may be selected to singularly operate without simultaneous operation of chamber 22.

On the other hand, given a heavier occupant, chambers 20 and 22 may be selected to simultaneously operate based on seat weight sensor and/or occupant position sensing algorithms known in the art. During simultaneous operation of the chambers 20 and 22, gas pressure produced from combustion of propellant 58 overcomes the burst shim 62 as gas passes through the aperture(s) 60 breaking the integrity of the seal 61. As such, gas produced from chambers 20 and 22 co-mingle in chamber 20 as they exit the gas exit apertures 66.

The wire mesh filter 64 can be formed from multiple layers or wraps of metal screen, for example. Although not limited thereby, U.S. Pat. Nos. 6,032,979 and 5,727,813, herein incorporated by reference, illustrate typical metal filters.

When compared to other inflators known in the art, the present inflator enhances the safety of the occupant by ensuring discrete operation of chambers 20 and 22 based on the weight of the occupant. Additionally, the design indicated in the figures inherently requires no retainers or locators. Therefore, the present inflator contains less parts overall and therefore simplifies manufacturing at a lower cost. Finally, should only chamber 20 be selected, the present design facilitates the activation of chamber 22 after about 15–20 seconds. However, there is no likelihood of redeploying the airbag and injuring an out-of-position occupant because chamber 20 contains a primary charge representing at least 70–80% of the total gas generant charge between the two chambers. Therefore, when chamber 22 is conductively or passively activated, there is only 20–30% of the overall propellant charge acting on the airbag. Stated another way, chamber 22 merely augments the primary gas force provided by chamber 20 upon activation. Chamber 22 would not singularly provide enough gas generation to effect the airbag inflation necessary to adequately protect the occupant, and therefore, it is only actively operated to work in conjunction with chamber 20.

It will be understood that the foregoing description of the preferred embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A dual chamber inflator for a vehicle occupant protection system comprising:

a housing comprising a base and a cap, said base further comprising a first plurality of gas exit apertures peripherally spaced therein;

a radial divider intermediate of said base and said cap for forming a first propellant chamber and a second propellant chamber within said cap and said base, respectively, said chambers operatively separated from each other, and, said divider comprising a top surface, a bottom surface, and at least one aperture providing fluid communication from the second chamber to the first propellant chamber;

a first gas generating propellant contained within said first chamber, said first propellant combusted upon activation of said inflator;

a second gas generating propellant contained within said second chamber, said second propellant optionally combusted simultaneously with said first propellant; and a seal fixed over said at least one aperture on said bottom surface thereby preventing simultaneous operation of said first chamber and said second chamber when only said first chamber is activated upon a crash event.

2. A dual chamber inflator for a vehicle occupant protection system comprising:

a housing comprising a base and a cap, said base further comprising a first plurality of gas exit apertures peripherally spaced therein;

a radial divider intermediate of said base and said cap for forming a first propellant chamber within said cap and a second propellant chamber within said base, said chambers operatively separated from each other, and, said divider comprising a top surface, a bottom surface, and at least one aperture providing fluid communication from the second chamber to the first propellant chamber;

a first gas generating propellant contained within said first chamber, said first gas generating propellant combusted upon activation of said inflator;

a second gas generating propellant contained within said second chamber, said second gas generating propellant optionally combusted simultaneously with said first gas generating propellant; and a seal fixed over said at least one aperture on said bottom surface thereby preventing simultaneous operation of said first chamber and said second chamber when only said first chamber is activated upon a crash event.

3. A dual chamber inflator for a vehicle occupant protection system comprising:

a housing comprising a base and a cap, said base further comprising a first plurality of gas exit apertures peripherally spaced therein;

a divider disc intermediate of said base and said cap for forming a first propellant chamber within said cap and a second propellant chamber within said base, said chambers operatively separated from each other, and, said divider disc comprising a top surface, a bottom surface, and at least one one aperture providing fluid communication from the second chamber to the first propellant chamber;

a first gas generating propellant contained within said first chamber, said first propellant combusted upon activation of said inflator;

a second gas generating propellant contained within said second chamber, said second propellant optionally combusted simultaneously with said first propellant; and a seal fixed over said at least one aperture on said bottom surface thereby preventing simultaneous operation of said first chamber and said second chamber when only said first chamber is activated upon a crash event.

* * * * *